Jan. 9, 1951  C. D. ROSSER, SR  2,537,237
CABLE SLITTING TOOL
Filed Aug. 23, 1948
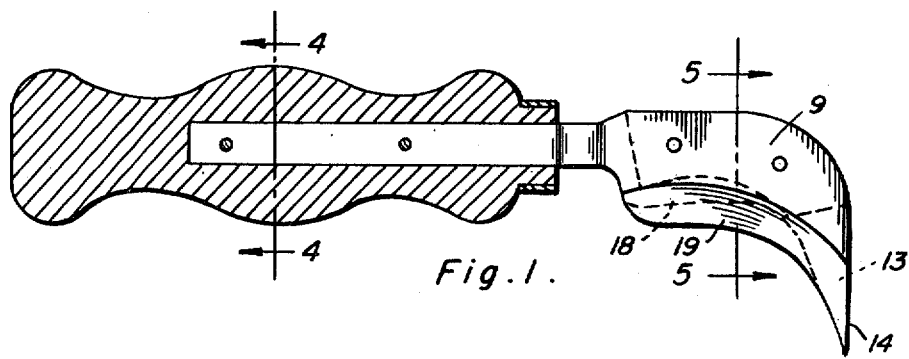
Fig. 1.
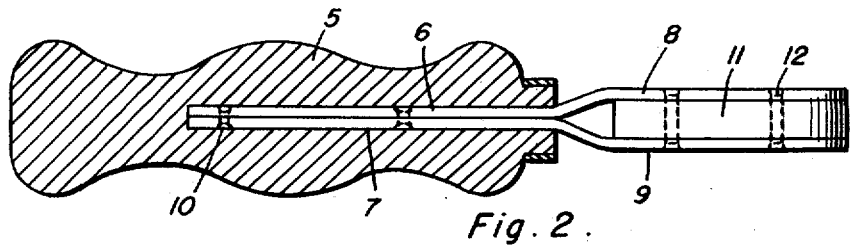
Fig. 2.
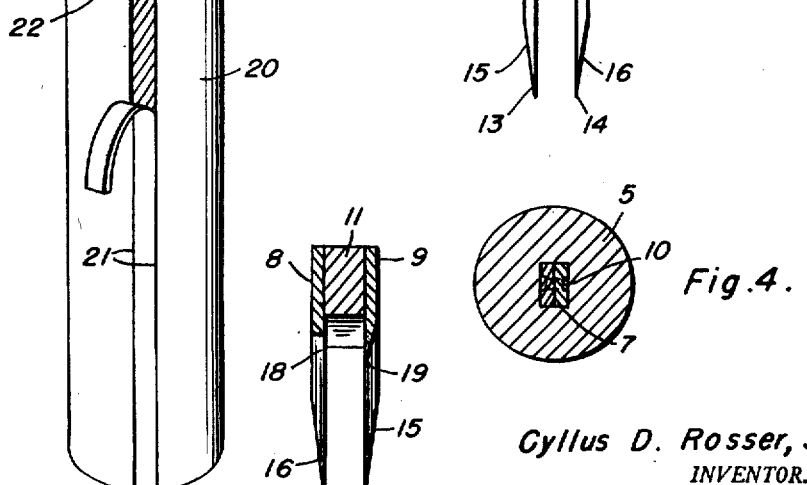
Cyllus D. Rosser, Sr.
INVENTOR.

Patented Jan. 9, 1951

2,537,237

UNITED STATES PATENT OFFICE 2,537,237

CABLE SLITTING TOOL

Cyllus D. Rosser, Sr., Gary, Ind., assignor of one-half to Francis H. Rosser, Gary, Ind.

Application August 23, 1948, Serial No. 45,758

2 Claims. (Cl. 30—91)

The present invention relates to new and useful improvements in tools for stripping the lead cover or casing from cable, preparatory to splicing or connecting the cable and more particularly to a cable stripping knife.

An important object of the invention is to provide a cable stripping knife composed of parallel blades for slitting the lead cover on cable along spaced parallel lines longitudinally of the cable.

A further object of the invention is to provide a cable stripping knife composed of spaced parallel blades having curved pointed outer ends to slit the cable longitudinally along parallel lines and also forming the side edge of one of the blades to protrude beyond the side edge of the other of the blades for cutting the cable circumferentially along a single line.

A still further object is to provide a tool of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming parts hereof, wherein like numerals refer to like parts throughout, and in which:

Figure 1 is a longitudinal sectional view through the handle showing the blades in side elevation;

Figure 2 is a longitudinal sectional view showing the back of the blades;

Figure 3 is a front elevational view;

Figure 4 is a transverse sectional view taken on a line 4—4 of Figure 1;

Figure 5 is a transverse sectional view taken on a line 5—5 of Figure 1, and

Figure 6 is a fragmentary perspective view of a cable showing the longitudinal and circumferential slits cut therein by the tool.

Referring now to the drawing in detail wherein for the purpose of illustration I have disclosed a preferred embodiment of the invention the numeral 5 designates a handle which may be constructed of wood or other suitable material and in which the flat shank portions 6 and 7 of a pair of blades 8 and 9 are secured in confronting relation in any suitable manner with the blades 8 and 9 projecting beyond the front end of the handle. The shanks 6 and 7 of the blades are preferably secured to each other by rivets or the like 10.

The blades 8 and 9, at their junction with the shanks are curved outwardly to space the blades from each other in parallelism and a spacing block 11 is secured between the blades by rivets or the like 12.

The blades 8 and 9 are curved longitudinally to form hook-shaped or curved pointed outer ends 13 and 14 respectively of duplicate shape and area and are beveled on their outer surfaces as shown at 15 and 16. The blade 8 rearwardly of its pointed curved outer end is blunt, as shown at 18.

The longitudinally curved edge of blade 9 projects beyond the adjacent edge of blade 8 and is also beveled on its outer surface in continuation of the beveling 14 whereby to form a cutting edge 19 at the curved side of blade 9.

In the use of the tool the pointed ends 13 and 14 of the blades are moved longitudinally along the lead cover or casing 20 of a cable to split the cover along parallel lines 21. After the cover has been split longitudinally a desired length from its end the cutter 19 of the blade 9 is used to cut the cover circumferentially along a single line as shown at 22 at the inner ends of the longitudinal lines or splits 21. The portion of the cover between the parallel lines 21 may then be easily removed as shown in Figure 6 of the drawing.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A cable stripping tool comprising a handle, and a pair of blades carried by the handle and including shanks secured to the handle, said blades projecting outwardly from the handle in spaced parallel relation to each other and curved along one edge, and pointed cutters at the outer curved ends of the blades, the longitudinal edge of one blade being blunt and the corresponding edge of the other blade being sharp and projecting beyond the longitudinal edge of the blunt blade.

2. A cable stripping tool comprising a pair of blades each including a shank, a handle attached to the inner ends of the shanks, a spacer between the back edges of the blades rigidly supporting the same in spaced parallel relation to each other, a curved pointed cutter at the outer edge of each blade, said cutters being coextensive with each other and alined for cutting a cable along parallel lines at a uniform depth, and a curved cutting edge on one of the blades inwardly of its pointed cutter to cut a cable circumferentially along a single line, the corresponding edge of the other blade being blunt.

CYLLUS D. ROSSER, Sr.

REFERENCES CITED

The following references are of record in the file of this patent:

UNITED STATES PATENTS

| Number | Name | Date |
| --- | --- | --- |
| 1,326,373 | Rice | Dec. 30, 1919 |
| 1,847,062 | Lemmon | Feb. 23, 1932 |
| 2,013,902 | Tarrant | Sept. 10, 1935 |
| 2,348,429 | Walker | May 9, 1944 |

FOREIGN PATENTS

| Number | Country | Date |
| --- | --- | --- |
| 102,410 | Australia | Nov. 2, 1937 |